US010995748B2

(12) United States Patent
Leonard

(10) Patent No.: US 10,995,748 B2
(45) Date of Patent: May 4, 2021

(54) AUTONOMOUS SUBMERSIBLE PUMP

(71) Applicant: Jeremy Leonard, Ardrossan (CA)

(72) Inventor: Jeremy Leonard, Ardrossan (CA)

( * ) Notice: Subject to any disclaimer, the term of this patent is extended or adjusted under 35 U.S.C. 154(b) by 228 days.

(21) Appl. No.: 15/820,918

(22) Filed: Nov. 22, 2017

(65) Prior Publication Data

US 2019/0085840 A1    Mar. 21, 2019

(30) Foreign Application Priority Data

Sep. 18, 2017 (CA) ............................... CA 2979356

(51) Int. Cl.
*F04B 49/06* (2006.01)
*F04B 49/04* (2006.01)
(Continued)

(52) U.S. Cl.
CPC ............ *F04B 49/20* (2013.01); *F04B 23/021* (2013.01); *F04B 23/04* (2013.01); *F04B 49/02* (2013.01);
(Continued)

(58) Field of Classification Search
CPC ...... F04B 23/021; F04B 23/04; F04B 49/022; F04B 49/04; F04B 49/06; F04B 49/065;
(Continued)

(56) References Cited

U.S. PATENT DOCUMENTS 2,325,930 A * 8/1943 Avigdor ................ H02K 5/132
310/87

2,797,702 A * 7/1957 Martin ..................... G05D 9/12
137/392

(Continued)

FOREIGN PATENT DOCUMENTS

CA   2991751 A1   1/2017
EP   0267445      5/1988
(Continued)

OTHER PUBLICATIONS

Smith, J. R., et al., "Operation of Subsea Electrical Submersible Pumps Supplied Over Extended Length Cable Systems," IEE Proceedings—Electric Power Applications, vol. 147(6): 544-552, Nov. 2000.

(Continued)

*Primary Examiner* — Alexander B Comley
(74) *Attorney, Agent, or Firm* — Christensen O'Connor Johnson Kindness, PLLC

(57) ABSTRACT

A system for pumping fluid is provided, having two or more submersible pumps, each submersible pump having an inlet, an outlet, a pumping mechanism that pumps fluid from the inlet to the outlet, a fluid level sensor for measuring a fluid level above the inlet, and a controller. The controller is programmed to activate the pumping mechanism when the fluid level sensor senses a minimum fluid level above the inlet and control the speed of the pumping mechanism based on the fluid level sensed by the fluid level sensor above the minimum fluid level between a minimum operating pump speed and a maximum operating pump speed. The submersible pumps are arranged in a vertical stack with the inlets of the submersible pumps spaced vertically. Each controller of each submersible pump operates autonomously relative to controllers of other submersible pumps in the vertical stack.

30 Claims, 4 Drawing Sheets

(51) Int. Cl.
| | |
|---|---|
| *F04B 23/02* | (2006.01) |
| *F04B 49/02* | (2006.01) |
| *F04B 23/04* | (2006.01) |
| *F04B 49/20* | (2006.01) |
| *G05D 9/12* | (2006.01) |
| *E03F 5/22* | (2006.01) |

(52) U.S. Cl.
CPC ............ *F04B 49/022* (2013.01); *F04B 49/04* (2013.01); *F04B 49/06* (2013.01); *G05D 9/12* (2013.01); *E03F 5/22* (2013.01)

(58) Field of Classification Search
CPC ........ F04B 49/20; F04D 13/08; F04D 13/086; F04D 13/10; F04D 13/12; F04D 13/14; F04D 13/16; F04D 15/0066; F04D 15/02–0236; F04D 15/0281–029; E03F 5/22; G05D 9/12
USPC .... 417/2–8, 36, 38, 40–41, 44.1, 44.2, 44.3, 417/244
See application file for complete search history.

(56) References Cited

U.S. PATENT DOCUMENTS

| | | | |
|---|---|---|---|
| 3,552,424 A | 1/1971 | Thompson | |
| 3,741,683 A * | 6/1973 | McTamaney | G05D 9/12 417/7 |
| 4,171,186 A * | 10/1979 | Chapman | F04B 49/025 417/17 |
| 4,222,711 A * | 9/1980 | Mayer | F04B 49/06 417/36 |
| 4,273,650 A * | 6/1981 | Solomon | B09C 1/002 210/104 |
| 4,303,833 A * | 12/1981 | Eckel | E03B 3/06 290/1 R |
| 4,437,811 A * | 3/1984 | Iwata | F04D 15/029 417/36 |
| 4,529,359 A | 7/1985 | Sloan | |
| 4,541,782 A * | 9/1985 | Mohn | F04D 13/10 417/244 |
| 4,652,802 A * | 3/1987 | Johnston | F04B 49/025 137/395 |
| 4,834,620 A * | 5/1989 | Sweeney | F04B 47/024 417/233 |
| 4,934,458 A * | 6/1990 | Warburton | B01D 17/0214 166/370 |
| 5,135,361 A * | 8/1992 | Dion | F04D 15/0072 417/2 |
| 5,449,274 A * | 9/1995 | Kochan, Jr. | F04D 15/0218 417/12 |
| 5,591,010 A * | 1/1997 | Van Zyl | G05D 9/12 417/12 |
| 5,604,315 A * | 2/1997 | Briefer | G01F 23/18 73/718 |
| 6,178,393 B1 * | 1/2001 | Irvin | F04D 15/0066 700/282 |
| 6,464,465 B2 * | 10/2002 | House | F04D 15/0218 417/40 |
| 6,606,905 B2 * | 8/2003 | Carroll | G01F 23/14 73/299 |
| 6,666,666 B1 | 12/2003 | Gilbert et al. | |
| 6,811,382 B2 * | 11/2004 | Buchanan | E21B 43/128 417/244 |
| 6,964,299 B2 * | 11/2005 | Scarsdale | E21B 43/128 166/105 |
| 7,131,330 B2 * | 11/2006 | Gurega | F04D 15/0218 73/306 |
| 7,195,462 B2 * | 3/2007 | Nybo | F04D 15/029 417/53 |
| 7,722,331 B2 * | 5/2010 | Hirasawa | F04B 41/02 417/44.2 |
| 7,931,447 B2 * | 4/2011 | Levin | F04B 49/065 417/306 |
| 8,123,458 B2 | 2/2012 | Racer et al. | |
| 8,371,821 B1 | 2/2013 | Mehr | |
| 8,430,641 B2 * | 4/2013 | Noel | H01H 35/18 116/110 |
| 8,435,009 B2 * | 5/2013 | Moore | F04D 15/0077 417/6 |
| 8,594,851 B1 * | 11/2013 | Smaidris | G05D 9/12 137/101.19 |
| 8,651,128 B2 | 2/2014 | Boyer et al. | |
| 8,657,583 B2 * | 2/2014 | Ward | F04D 15/0218 417/36 |
| 8,662,829 B2 | 3/2014 | Pasquesi et al. | |
| 8,858,199 B2 | 10/2014 | Janesky | |
| 8,956,130 B2 | 2/2015 | Buzit et al. | |
| 8,985,964 B2 * | 3/2015 | Noel | F04B 49/025 116/110 |
| 8,992,182 B2 * | 3/2015 | Robinson | F04B 49/025 417/12 |
| 9,068,338 B2 | 6/2015 | Padgett, Jr. | |
| 9,482,232 B2 * | 11/2016 | Andersen | F04D 1/063 |
| 2002/0106280 A1 * | 8/2002 | Beard | F04D 15/029 417/3 |
| 2003/0116323 A1 * | 6/2003 | Pettigrew | E21B 43/128 166/369 |
| 2008/0286134 A1 * | 11/2008 | Regalado | F04D 13/10 417/423.3 |
| 2009/0093915 A1 * | 4/2009 | Parkinson | E03F 5/22 700/282 |
| 2009/0183785 A1 | 7/2009 | Cole et al. | |
| 2014/0134005 A1 * | 5/2014 | Larsson | F04D 13/08 417/53 |
| 2017/0234321 A1 | 8/2017 | Meyer | |

FOREIGN PATENT DOCUMENTS

| | | |
|---|---|---|
| WO | 2013171053 A1 | 11/2013 |
| WO | 2016044945 A1 | 3/2016 |

OTHER PUBLICATIONS

Kumar, A., "Basement Thingamajig," <http://thisisnotcnn.blogspot.com> [retrieved Aug. 2011], 6 pages.

"Keep Your Basement Dry With Stacked Sump Pumps," <https://www.instructables.com> [retrieved Apr. 24, 2017], 9 pages.

* cited by examiner

AUTONOMOUS SUBMERSIBLE PUMP

TECHNICAL FIELD

This relates to pumping liquid using submersible pumps that are designed to be autonomously controlled.

BACKGROUND

When performing work on municipal water systems, such as drains, sewers, etc., it is often necessary to divert the water upstream of the work site. Other situations also require water to be moved from one location to another. For example, underground or low lying areas may be prone to filling with water due to high ground water levels or rain events, or water may be require to be moved for industrial purposes. U.S. Pat. No. 6,964,299 (Scarsdale) entitled "SUBMERSIBLE PUMPING SYSTEM" teaches a pumping system used in waste fluid disposal applications. U.S. Pat. No. 8,662,829 (Pasquesi et al.) entitled "PUMP GUARD ADAPTOR, SYSTEM AND METHOD OF ADAPTATION THEREOF" teaches sump pumps for removal of water that may be used in a stacked configuration.

SUMMARY

According to an aspect, there is provided a system for pumping fluid, comprising two or more submersible pumps, each submersible pump comprising an inlet, an outlet, a pumping mechanism that pumps fluid from the inlet to the outlet, a fluid level sensor for measuring a fluid level above the inlet, a controller programmed to activate the pumping mechanism when the fluid level sensor senses a minimum fluid level above the inlet and to control the speed of the pumping mechanism based on the fluid level sensed by the fluid level sensor above the minimum fluid level. The speed is controlled between a minimum operating pump speed and a maximum operating pump speed. The submersible pumps are arranged in a vertical stack such that the inlets of the submersible pumps are spaced vertically. Each controller of each submersible pump operates autonomously relative to controllers of other submersible pumps in the vertical stack.

In other aspects, the system for pumping fluid may include one or more of the following aspects: the outlet may be positioned vertically above the inlet; the outlet may comprise a fluid line that extends vertically above the pumping mechanism; the outlets of the submersible pumps may all connect to a common fluid line; the controller may be carried by the submersible pump; the fluid level sensor may sense the weight of the fluid above the fluid level sensor; the maximum operating pump speed may correspond to a predetermined upper fluid level; the fluid level sensor may have a lower limit of detection corresponding to the minimum fluid level and an upper limit of detection corresponding to an upper fluid level; the controller may calculate a rate of change in the fluid level sensed by the fluid level sensor, and increase the pumping mechanism when an increase in the fluid level is sensed, and decrease the speed of the pumping mechanism when a decrease in the fluid level is sensed; the system for pumping fluid may further comprise a fluid pressure sensor for measuring the degree of obstruction of the inlet; the outlet may comprise a vertical fluid line and the controller may be programmed to turn off the pumping mechanism when the fluid pressure detected by the fluid pressure sensor reaches a predetermined level of obstruction such that the fluid in the vertical fluid line is allowed to backflow through the inlet and flush the obstruction from the inlet and turn on the pumping mechanism after the backflow is completed; the submersible pumps may be oriented at different rotational positions relative to adjacent submersible pumps in the vertical stack.

According to an aspect, there is provided method of pumping fluid, comprising predicting a maximum flow rate of fluid to be pumped from a fluid location having a fluid level, calculating a number of submersible pumps required to manage the predicted maximum flow rate, vertically stacking the number of submersible pumps at the fluid location, each submersible pump comprising an inlet, an outlet, a pumping mechanism that pumps fluid from the inlet to the outlet, and a fluid level sensor for measuring a fluid level above the inlet, the submersible pumps being stacked such that the inlets of the submersible pumps are spaced vertically in the vertical stack, activating each pumping mechanism when the corresponding fluid level sensor senses a minimum fluid level above the inlet, and controlling the speed of each pumping mechanism based on the fluid level sensed by the corresponding fluid level sensor above the minimum fluid level between a minimum operating pump speed and a maximum operating pump speed, wherein each pumping mechanism is activated and the speed of each pumping mechanism is controlled independently of the other submersible pumps in the vertical stack.

In other aspects, the method of pumping fluid may include one or more of the following aspects: the controller may be carried by the submersible pump; the outlet may comprise a fluid line that extends vertically above the pumping mechanism; the outlets of the submersible pumps may all connect to a common fluid line; the speed of each pumping mechanism may be controlled using a controller carried by each submersible pump; the fluid level sensor may sense the weight or fluid pressure of the fluid above the fluid level sensor, the fluid level sensor may have a lower limit of detection corresponding to the minimum fluid level and an upper limit of detection corresponding to an upper fluid level; the operating pump speed may be increased to the maximum operating pump speed when the fluid level reaches a predetermined upper fluid level; controlling the speed of each pumping mechanism may comprise calculating a rate of change in the fluid level sensed by the fluid level sensor, increasing an operating pump speed of the pumping mechanism when an increase in the fluid level is sensed, and decreasing the operating pump speed of the pumping mechanism when a decrease in the fluid level is sensed; the submersible pumps may further comprise a fluid pressure sensor for measuring the degree of obstruction of the inlet; the outlet may comprise a vertical fluid line and the method may further comprise the steps of stopping the pumping mechanism when the fluid pressure detected by the fluid pressure sensor reaches a predetermined level of obstruction such that the fluid in the vertical fluid line is allowed to backflow through the inlet and flush the obstruction from the inlet, and reactivating the pumping mechanism after the backflow is completed; vertically stacking the number of submersible pumps may comprise orienting the submersible pumps at different rotational positions relative to adjacent submersible pumps in the vertical stack.

According to an aspect, there is provided a submersible pump comprising an inlet, an outlet positioned vertically above the inlet, a pumping mechanism that moves the fluid from the inlet to the outlet through a vertical fluid line, a fluid level sensor for measuring a fluid level above the inlet, a fluid pressure sensor for measuring the degree of obstruction of the inlet, and a controller programmed to activate the pumping mechanism when the fluid level sensor senses a minimum fluid level above the inlet, and control the speed of the pumping mechanism based on the fluid level sensed by the fluid level sensor above the minimum fluid level between a minimum operating pump speed and a maximum operating pump speed, monitor the degree of obstruction of the inlet using the fluid pressure sensor, turn off the pumping mechanism when the fluid pressure detected by the fluid pressure sensor reaches a predetermined level of obstruction such that the fluid in the vertical fluid line is allowed to backflow through the inlet and flush the obstruction from the inlet, and turn on the pumping mechanism after the backflow is completed.

In other aspects, the submersible pump may include one or more of the following aspects: the controller may be carried by the submersible pump; the fluid level sensor may measure the weight or fluid pressure of the fluid above the fluid level sensor; the fluid level sensor may have a lower limit of detection corresponding to the minimum fluid level and an upper limit of detection corresponding to the upper fluid level; the maximum operating pump speed corresponds to a predetermined upper fluid level; the controller may calculate a rate of change in the fluid level sensed by the fluid level sensor, increase the pumping mechanism when an increase in the fluid level is sensed, and decrease the speed of the pumping mechanism when a decrease in the fluid level is sensed.

In other aspects, the features described above may be combined together in any reasonable combination as will be recognized by those skilled in the art.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
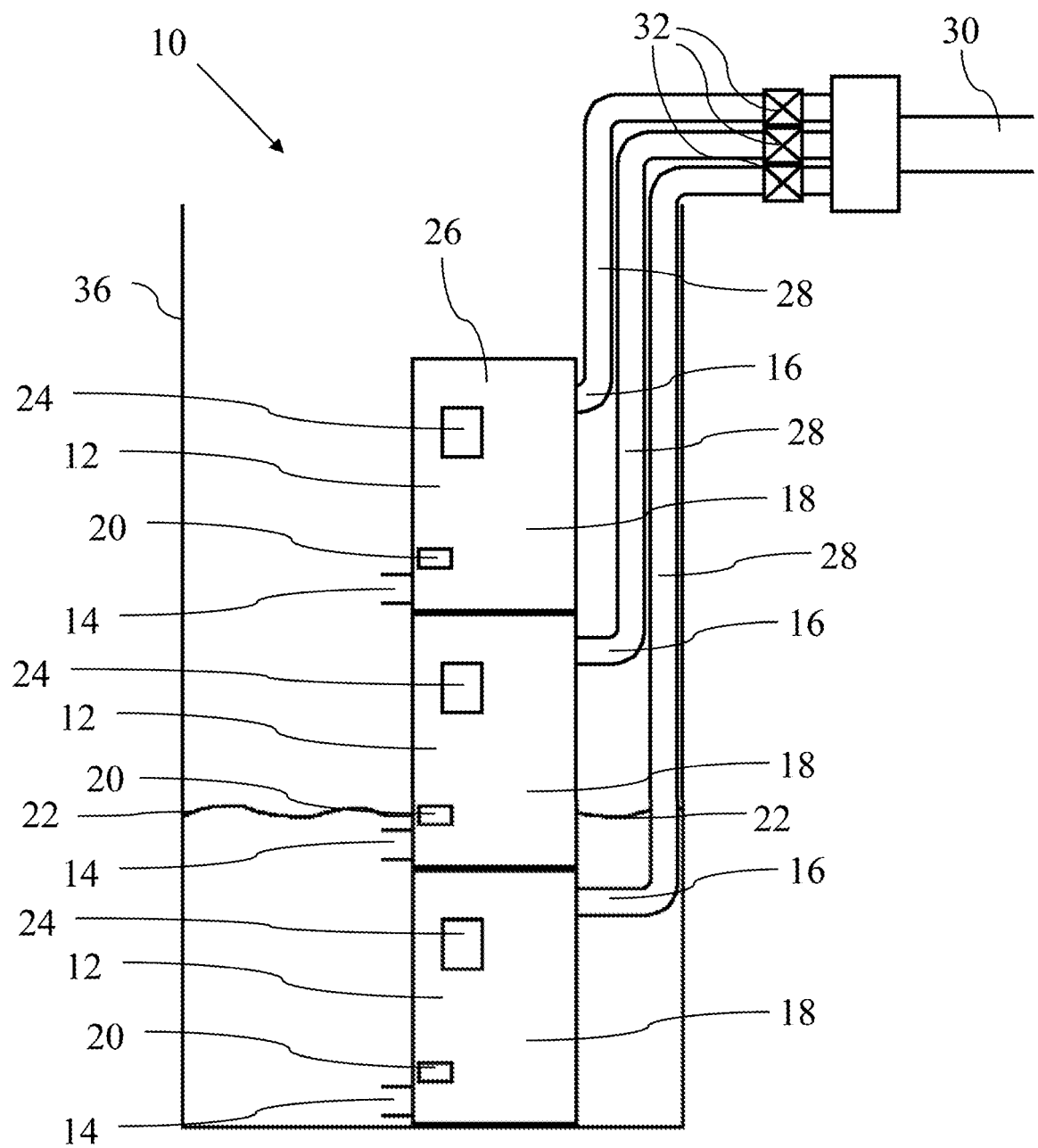
FIG. 1 is a side elevation view of a stacked submersible pumping system.

A system for pumping fluid, generally identified by reference numeral 10, will now be described with reference to FIG. 1 through 4.

Figure 2:
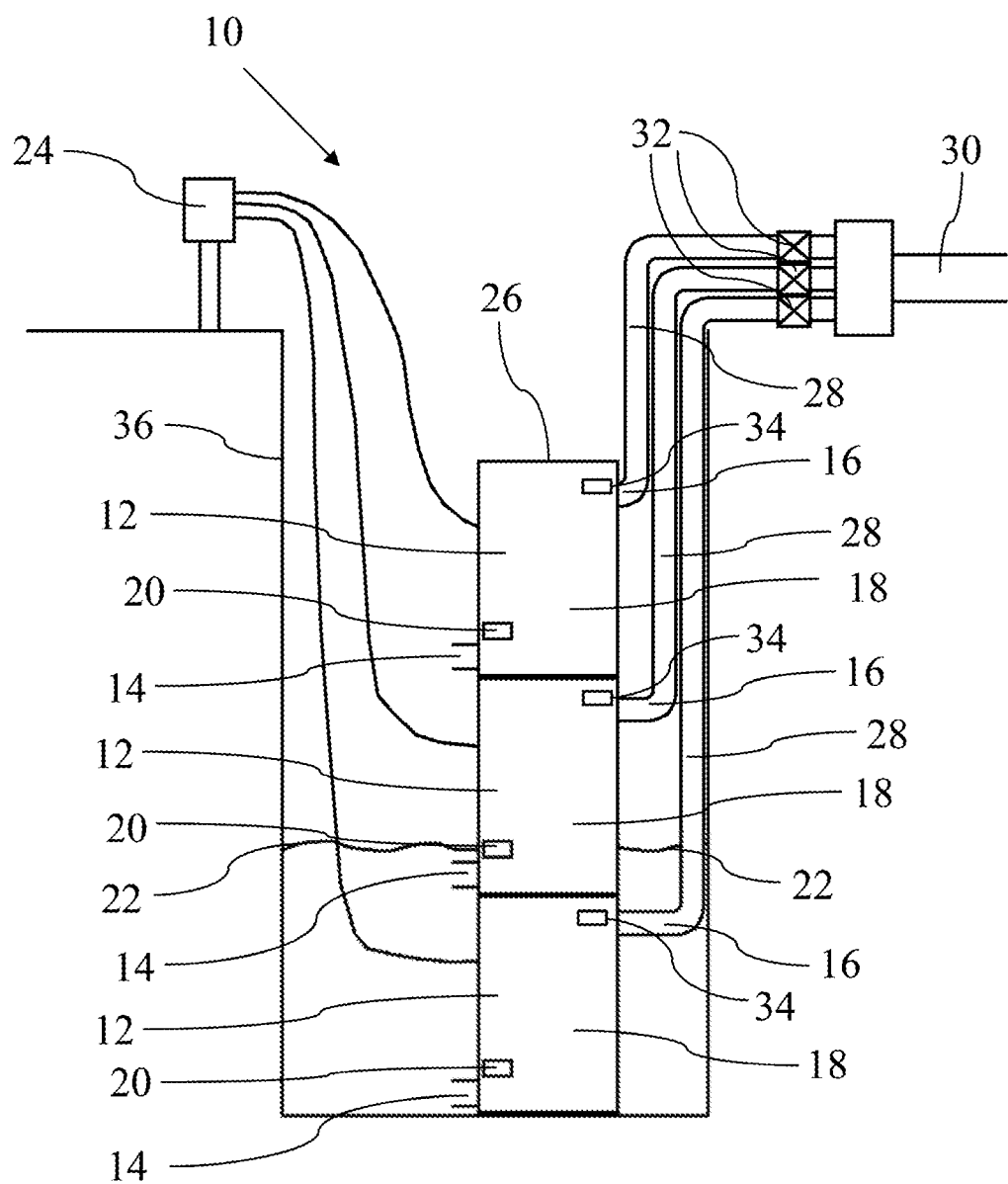
FIG. 2 is a side elevation view of an alternate stacked submersible pumping system.

Referring to FIG. 1, system for pumping fluid 10 has multiple submersible pumps 12 that are provided to address changing water levels and flowrates. The example in FIG. 1 uses three submersible pumps 12, although it will be understood that the number of pumps 12 will depend on the particular situation. Each submersible pump 12 has an inlet 14, an outlet 16, a pumping mechanism 18 that pumps fluid from inlet 14 to outlet 16, a fluid level sensor 20 for measuring the fluid level 22 above inlet 14, and a controller 24. Outlet 16 includes a fluid line 28 that communicates the pumped fluid toward the intended destination. In the depicted embodiment, where pumps 12 are positioned in a subterranean location, such as in a sewer or drainage system, fluid lines 28 extend vertically away pumping mechanism 18 and preferably, as shown in FIG. 1 and FIG. 2, connect to a common fluid line 30. As depicted, control valves 32 are provided at the end of fluid lines 28, and fluid lines 28 are then connected to common fluid line 30. There may be more than one control valve 32 on each line, and may be any suitable type of valve, such as a vacuum breaker, a check valve, or manually or automatically actuated valve. The actual design of submersible pump 12, including the relative placement of the various components, may vary depending on the preferences of the user and available equipment. The details of pumping mechanism 18 are not shown, as these are well known in the industry and can be designed as necessary. Submersible pump 12 may then be modified as necessary based on the teachings herein.

As depicted, each submersible pump has a controller 24, which is programmed to activate pumping mechanism 18 when fluid level sensor 20 senses a minimum fluid level above inlet 14. Controller 24 preferably also controls the speed of pumping mechanism 18 based on the fluid level 22 sensed by fluid level sensor 20 above the minimum fluid level between a minimum operating pump speed and a maximum operating pump speed at an upper fluid level. The upper fluid level will be the fluid level 22 at which pumping mechanism 18 is operating at its maximum speed. This may, for example, be the top of the pumping mechanism 18, a point along the pumping mechanism 18, or a point above the top of the pumping mechanism 18. Fluid level sensor 20 may take a variety of forms, as will be understood. For example, fluid level sensor 20 may take the form of a sensor that senses the weight or fluid pressure of the fluid above the fluid level sensor 20. Other types of sensors may also be used that allow the fluid level to be sensed within a range relative to the respective submersible pump 12. For example, fluid level sensor 20 may be an optical sensor that detects the fluid surface, a float sensor, or other types of sensors known in the art. However, it has been found that, for many applications that may involve liquid that are slurries or carry debris, some sensors may fail to operate correctly, and that a sensor that detects the weight of fluid is generally more reliable. Fluid level sensor 20 may have a lower limit of detection that corresponds to the minimum fluid level and an upper limit of detection that corresponds to the upper fluid level of the respective submersible pump 12. When controlling the operating speed of pump 12, controller 24 may be programmed to calculate a rate of change in fluid level 22 sensed by fluid level sensor 20 in order to anticipate rapid changes in fluid level 22. For example, controller 24 may increase speed of pumping mechanism 18 based on the rate at which fluid level 22 is increasing rather than merely fluid level 22 alone. Controller 24 may also slow the pump speed of pump 12 based on a calculated rate of decrease in fluid level 22. Different algorithms and control options may be used depending on optimal pump efficiencies for a particular situation. As shown in FIG. 1, controller 24 may be carried by submersible pump 12. Alternatively, as shown in FIG. 2, controller 24 may be on a ground surface or other control location that is accessible by an operator. Controller 24 may have a direct connection, but may also communicate with submersible pump 12 wirelessly. Controller 24 may also include a display (not shown) that displays sensor data or operating conditions, or may have a transmitter that communicates the date and operating conditions to a separate device, such as a portable electronic device, or to a network to be communicated to a central monitoring location.

Figure 3:
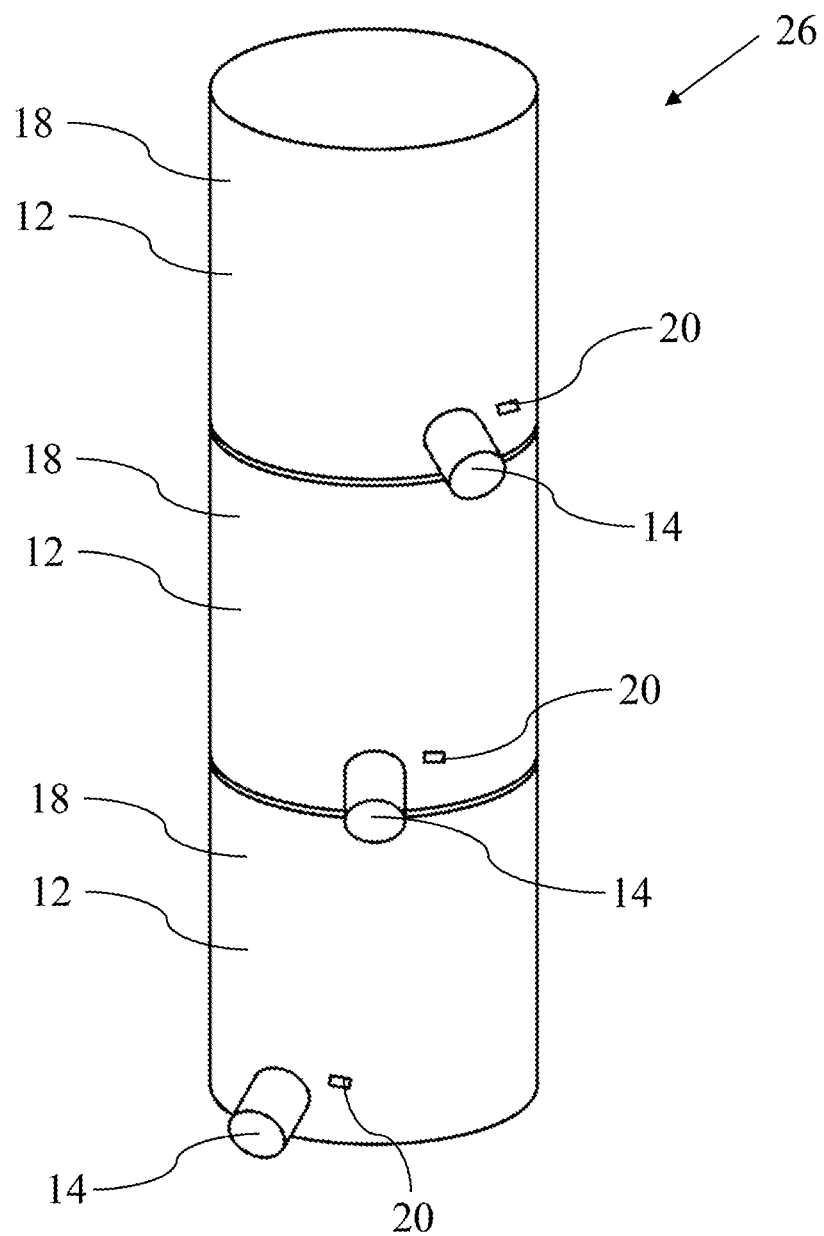
FIG. 3 is a perspective view of a stacked submersible pumping system with offset inlets.

As shown in FIG. 1, submersible pumps 12 are preferably arranged in a vertical stack 26 in a fluid location 36, such that inlets 14 of submersible pumps 12 are spaced vertically. Each controller 24 of each submersible pump 12 operates autonomously relative to controllers 24 of other submersible pumps 12 in the vertical stack 26. Various design options are available that may change based on the anticipated volume of liquid to be pumped, as well as the available space, and the capacity of pumps 12 being used. For example, there may be more than one stack 26 provided, the capacity of pumps 12 may vary within the stack, the vertical spacing of pumps 12 may vary to increase or decrease capacity at a particular fluid level, etc. In each case, controllers 24 are designed to independently control the associated submersible pump 12, which operates based on the fluid level that is sensed by sensor 20, rather than the actual fluid level 22. Referring to FIG. 3, to facilitate installation, submersible pumps 12 may have different rotational orientations relative to adjacent submersible pumps 12 in the vertical stack, such that inlets 14 and outlets 16 are offset from each other.

Referring to FIG. 2, each submersible pump 12 is shown as having a fluid pressure sensor 34 that is indicative of for measuring the degree of obstruction of the respective inlet 14. Pressure sensor 34 is preferably located to measure fluid pressure in outlet 16 of submersible pump 12 or vertical fluid line 28 such that it detects obstructions in inlet 14 based on an expected pressure related to the operation of submersible pump 12. Where outlet 16 is a vertical fluid line 28, controller 24 may be programmed to turn off pumping mechanism 18 when readings from fluid pressure sensor 34 indicate a sufficient obstruction that requires maintenance or intervention. Controller 24 may be programmed to flush pump 12 by turning off or reversing pump 12, which allows fluid in vertical fluid line 28 to backflow through pump 12, as permitted by vacuum breaker 32, and flush any obstructions from pump 12. The controller 24 then returns pump 12 to normal operation. If backflushing is unsuccessful, controller 24 may be programmed to send an alarm signal to an operator, shut down pump 12, or reduce operating speeds to safe levels, as the case may be. It will be understood that the arrangement of submersible pumps 12 is such that this backflow procedure can be completed by each pump 12 separately. As will be understood, any increase in fluid level 22 due to the failure or reduction in capacity of another pump 12 will result in other pumps 12 increasing their pumping speed to accommodate for the increase automatically, without any direct communication between the pumps 12.

An example of a method of pumping fluid will now be described based on the principled discussed above. The discussion below is not intended to be an exhaustive discussion of all possible operating procedures or methods that may be possible and alternatives will be apparent to those skilled in the art.

The volume of fluid to be pumped for a particular fluid location 36 having a fluid level 22 is predicted, and the number of submersible pumps 12 required to manage the predicted maximum flow rate is calculated, as is known in the art. Preferably, the predictions are based on maximum flow rates, which may vary. For example, in a residential sewer application, a higher flow rate will be expected during the morning hours and in the evening. The design may also account for additional capacity as a safety margin due to an unexpected increase in water, the failure of a pump, or other factors as is known in the art. The number of submersible pumps 12 may also be calculated to include standby pumps that will not be immersed in the fluid, or their minimum fluid level will not be reached, during normal operation under the predicted maximum flow rate. The standby pumps instead will only be activated if a lower pump in the system fails. Failure of a lower pump will cause the water level to rise such that the standby pump is activated. Once calculated, the appropriate number of submersible pumps 12 are vertically stacked at fluid location 36 such that inlets 14 of submersible pumps 12 are spaced vertically in vertical stack 26. Each pumping mechanism 18 is activated when the corresponding fluid level sensor 20 senses a minimum fluid level above inlet 14, and the operating speed of each submersible pump 12 is controlled based on fluid level 22 sensed by each respective fluid level sensor 20 above the minimum fluid level. Based on the sensed fluid level, controller 24 controls the speed of each submersible pump 12 between a minimum operating pump speed, and a maximum operating pump speed at an upper fluid level. Controller 24 may also increase the speed based on a sensed rate of change in order to anticipate fluid levels to achieve a more efficient pumping system. Each pumping mechanism 18 is activated and its speed controlled independently of the other submersible pumps 12 in vertical stack 26.

Preferably, pumps 12 are designed to be able to clear their respective inlets 14 by backflushing. In such a case, when the fluid pressure detected by fluid pressure sensor 34 is indicative of a predetermined level of obstruction, controller 24 stops or reverses pumping mechanism 18 to allow fluid in vertical fluid line 28 to backflow through pumping mechanism 18 in order to attempt to flush any obstructions. Pump 12 is then reactivated after the backflow is completed. If the obstruction persists, pump 12 may be deactivated by controller 24, or operated at a safe operating speed to avoid damage, and an alarm may be activated, such as by sending a signal to an operator, or providing a visual or audible alarm.

Fluid level sensor 20 and/or controller 24 are preferably calibrated to detect, at a minimum, the liquid level above pump intake 14 from a minimum defined fluid level to a maximum defined fluid level, between which controller 24 controls the speed of pump 12 between a minimum and maximum speed. the instructions programmed into controller 24 will depend at least in part on the position of sensor 20 relative to pump intake 14. For example, fluid level sensor 20 may be calibrated to a value that is indicative of a minimum fluid level at which point it is safe to operate pump 12, as well as detecting changes in conditions such as the pressure or weight of liquid increasing, the liquid pressure remaining constant, or the liquid pressure decreasing. Where fluid pressure sensor 34 is provided downstream of pump intake 14, it may detect a zero pressure condition, which may be calibrated prior to use of pump 12. It may also detect that the pressure is increasing, the pressure is decreasing, the pressure is holding at a value that is above zero, or that the pressure has reached a threshold such that a backflow is performed.

In addition to the sensors, pump 12 has a number of actions available. Prior to the water reaching the minimum level, the pump may be off. The pump may then increase its RPM as the water level increases, maintain its RPM if the water level stays the same, or decrease its RPM if the water level decreases or if the water level is decreasing at a desired rate. While all of the pumps operate independently, are not connected, and have independent sensors and controllers, their combined effect serves to control the overall fluid level, and the rate of pumping of the system automatically.

Figure 4:
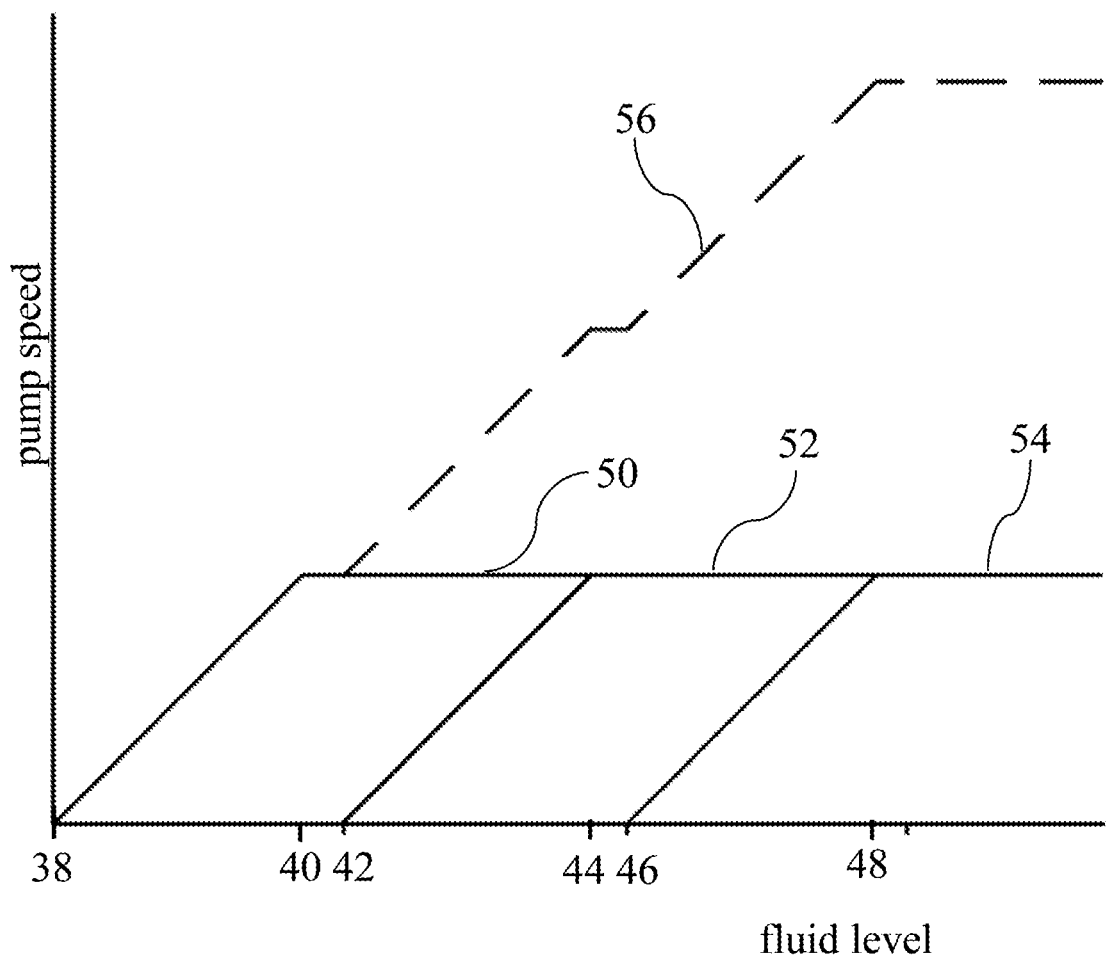
FIG. 4 is a diagram of a pump speed and fluid level chart.

Referring to FIG. 4, an example of the combined effect of the stacked submersible pumps 12 is shown. Point 38 indicates the minimum fluid level for the bottom pump 12 on the vertical stack 26, while point 40 indicates the upper fluid level at which the bottom pump is operating at its maximum operating pump speed. Points 42 and 46 similarly indicate the minimum fluid level for the next two pumps, while points 44 and 48 indicate the upper fluid level. Lines 50, 52, and 54 indicate the pump speeds for each of the pumps 12 individually, while line 56 indicates the combined pump speed. The graph shows a slight delay between when one pump reaches its maximum pump speed, and when the next pump starts pumping. The pump speeds and controllers may be designed such that the overall transition is smooth, i.e. a higher pump is activated at the same fluid level at which a lower pump reaches its maximum speed, or with an overlap, such that the higher pump is activated before the lower pump reaches its maximum speed. It will also be noted that the depicted graph is based solely on fluid level, and not the rate of change of the fluid level. When fluid level is changing more quickly, taking into account the rate of change will generally result in a steeper curve, as the pump anticipates the fluid level that will be reached, and adjusts the pump speed accordingly.

It will be understood that, while it is preferable that the maximum capacity of each pump 12 is the same, with vertical stack 26 being made up of the same types of pumps 12, some pumps 12 may be provided with a higher or lower maximum pump capacity or speed, depending on the situation and specifications used. In the example shown there is a certain fluid depth between the upper fluid level of a lower pump and the minimum fluid level of the overlying pump. In this range the lower pump is operating at its maximum speed, but the overlying pump has not yet turned on. It will be understood that these minimum and maximum levels may be the same, such that the overlying pump turns on as the lower pump reaches its maximum pump operating speed, or the range may be reversed, such that the overlying pump turns on prior to the lower pump reaching its maximum operating speed. It will be understood that these types of modifications will alter the shape of the combined pump speed 56. It will also be understood that, as each controller 24 is designed to with a particular pump 12 in mind, no additional work is required to configure pumps 12 beyond installing them in a desired order in stack 26.

By providing pumps 12 as described above that are independently controlled, a system of modular pumps can be provided that is versatile, flexible, and can accommodate different situations simply by installing particular sizes and numbers of pumps, based on a characterization of the expected fluid level in any given situation. As the pumps operate independently, there is no need for an operator to control them, beyond a general supervision to ensure pumps 12 have been installed correctly, and are operating within normal parameters.

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A system for pumping fluid, comprising:
   two or more submersible pumps, each submersible pump comprising:
      an inlet;
      an outlet;
      a fluid pump that pumps fluid along a fluid path from the inlet to the outlet;
      a fluid level sensor for measuring a fluid level above the inlet;
      a controller programmed to:
         activate the fluid pump when the fluid level sensor senses a minimum fluid level above the inlet; and
         control the speed of the fluid pump based on the fluid level sensed by the fluid level sensor above the minimum fluid level between a minimum operating pump speed and a maximum operating pump speed, wherein, with the fluid level between the minimum fluid level and the maximum fluid level, the speed of the fluid pump increases toward the maximum operating pump speed as the fluid level increases and decreases toward the minimum operating pump speed as the fluid level decreases to maintain the fluid level;
      wherein the submersible pumps are arranged coaxially in a vertical stack along a common vertical axis such that the inlets of the submersible pumps are spaced vertically, wherein the fluid paths of the two or more submersible pumps are connected in parallel, and wherein each controller of each submersible pump operates autonomously relative to controllers of other submersible pumps in the vertical stack.

2. The system for pumping fluid of claim 1, wherein, for each submersible pump, the outlet is positioned vertically above the inlet.

3. The system for pumping fluid of claim 1, wherein, for each submersible pump, the outlet comprises a fluid line that extends vertically above the fluid pump.

4. The system for pumping fluid of claim 1, wherein each of the outlets of the two or more submersible pumps are connected to a common fluid line downstream of a check valve.

5. The system for pumping fluid of claim 1, wherein, for each submersible pump, the controller is carried by the submersible pump.

6. The system for pumping fluid of claim 1, wherein, for each submersible pump, the fluid level sensor measures a weight of fluid above the fluid level sensor.

7. The system for pumping fluid of claim 1, wherein, for each submersible pump, the fluid level sensor has a lower limit of detection corresponding to the minimum fluid level and an upper limit of detection corresponding to an upper fluid level.

8. The system for pumping fluid of claim 1, wherein, for each submersible pump, the controller calculates a rate of change in the fluid level sensed by the fluid level sensor, and increases the speed of the fluid pump when an increase in the fluid level is sensed, and decreases the speed of the fluid pump when a decrease in the fluid level is sensed.

9. The system for pumping fluid of claim 1, wherein, for each submersible pump, the maximum operating pump speed corresponds to a predetermined upper fluid level.

10. The system for pumping fluid of claim 1, wherein each submersible pump further comprises a fluid pressure sensor for measuring a degree of obstruction of the inlet.

11. The system for pumping fluid of claim 10, wherein, for each submersible pump, the outlet comprises a vertical fluid line and the controller is programmed to:
   turn off the fluid pump when the fluid pressure detected by the fluid pressure sensor reaches a predetermined level of obstruction such that fluid in the vertical fluid line is allowed to backflow through the inlet and flush the obstruction from the inlet; and
   turn on the fluid pump after the backflow is completed.

12. The system for pumping fluid of claim 1, wherein the two or more submersible pumps are oriented at different rotational positions relative to adjacent submersible pumps in the vertical stack.

13. A method of pumping fluid, comprising:
predicting a maximum flow rate of fluid to be pumped from a fluid location having a fluid level;
calculating a number of submersible pumps required to manage the predicted maximum flow rate;
vertically stacking the number of submersible pumps at the fluid location coaxially along a common vertical axis, each submersible pump comprising an inlet, an outlet, a fluid pump that pumps fluid along a fluid path from the inlet to the outlet, and a fluid level sensor, the submersible pumps being stacked such that the inlets of the submersible pumps are spaced vertically in the vertical stack and such that the fluid paths of the number of submersible pumps are connected in parallel;
measuring a fluid level above the inlet of each submersible pump using the corresponding fluid level sensor;
activating each fluid pump when the corresponding fluid level sensor senses a minimum fluid level above the corresponding inlet; and
controlling the speed of each fluid pump based on the fluid level sensed by the corresponding fluid level sensor above the minimum fluid level between a minimum operating pump speed and a maximum operating pump speed at a maximum fluid level, wherein the speed of the fluid pump increases toward the maximum operating pump speed as the fluid level increases and decreases toward the minimum operating pump speed as the fluid level decreases to maintain a constant fluid level;
wherein each fluid pump is activated and the speed of each fluid pump is controlled independently of the other submersible pumps in the vertical stack.

14. The method of pumping fluid of claim 13, wherein, for each submersible pump, the outlet is positioned vertically above the inlet.

15. The method of pumping fluid of claim 13, wherein, for each submersible pump, the outlet comprises a fluid line that extends vertically above the fluid pump.

16. The method of pumping fluid of claim 13, wherein each of the outlets of the number of submersible pumps connect to a common fluid line via a check valve.

17. The method of pumping fluid of claim 13, wherein the speed of each fluid pump is controlled using a controller carried by each submersible pump.

18. The method of pumping fluid of claim 13, wherein, for each submersible pump, the fluid level sensor measures a weight of fluid above the fluid level sensor.

19. The method of pumping fluid of claim 13, wherein, for each submersible pump, the fluid level sensor has a lower limit of detection corresponding to the minimum fluid level and an upper limit of detection corresponding to an upper fluid level.

20. The method of pumping fluid of claim 13, wherein controlling the speed of each fluid pump comprises calculating a rate of change in the fluid level sensed by the fluid level sensor, increasing an operating pump speed of the fluid pump when an increase in the fluid level is sensed, and decreasing the operating pump speed of the fluid pump when a decrease in the fluid level is sensed.

21. The method of pumping fluid of claim 13, wherein the speed of each fluid pump is increased to the maximum operating pump speed when the fluid level reaches a predetermined upper fluid level above the corresponding inlet.

22. The method of pumping fluid of claim 13, further comprising for each submersible pump, a fluid pressure sensor for measuring a degree of obstruction of the inlet.

23. The method of pumping fluid of claim 22, wherein, for each submersible pump, the outlet comprises a vertical fluid line and further comprising the steps of:
stopping the fluid pump when the fluid pressure detected by the fluid pressure sensor reaches a predetermined level of obstruction such that fluid in the vertical fluid line is allowed to backflow through the inlet and flush the obstruction from the inlet; and
reactivating the fluid pump after the backflow is completed.

24. The method of pumping fluid of claim 13, wherein vertically stacking the number of submersible pumps comprises orienting the submersible pumps at different rotational positions relative to adjacent submersible pumps in the vertical stack.

25. A submersible pump comprising:
an inlet;
an outlet positioned vertically above the inlet;
a fluid pump that moves fluid from the inlet to the outlet through a vertical fluid line;
a fluid level sensor for measuring a fluid level above the inlet;
a fluid pressure sensor for measuring a degree of obstruction of the inlet; and
a controller programmed to:
activate the fluid pump when the fluid level sensor senses a minimum fluid level above the inlet; and
control the speed of the fluid pump based on the fluid level sensed by the fluid level sensor above the minimum fluid level between a minimum operating pump speed and a maximum operating pump speed;
monitor the degree of obstruction of the inlet using the fluid pressure sensor;
turn off the fluid pump when the fluid pressure detected by the fluid pressure sensor reaches a predetermined level of obstruction such that fluid in the vertical fluid line is allowed to backflow through the inlet and flush the obstruction from the inlet; and
turn on the fluid pump after the backflow is completed.

26. The submersible pump of claim 25, wherein the controller is carried by the submersible pump.

27. The submersible pump of claim 25, wherein the fluid level sensor measures a weight of fluid above the fluid level sensor.

28. The submersible pump of claim 25, wherein the fluid level sensor has a lower limit of detection corresponding to the minimum fluid level and an upper limit of detection corresponding to an upper fluid level.

29. The submersible pump of claim 25, wherein the maximum operating pump speed corresponds to a predetermined upper fluid level.

30. The submersible pump of claim 25, wherein the controller calculates a rate of change in the fluid level sensed by the fluid level sensor, and increases the speed of the fluid pump when an increase in the fluid level is sensed, and decreases the speed of the fluid pump when a decrease in the fluid level is sensed.

* * * * *